Aug. 31, 1954
F. K. KUGEL ET AL
2,687,657
FLUID DRIVE
Filed Feb. 27, 1950
6 Sheets-Sheet 1
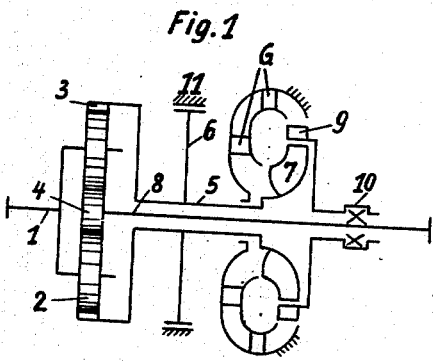
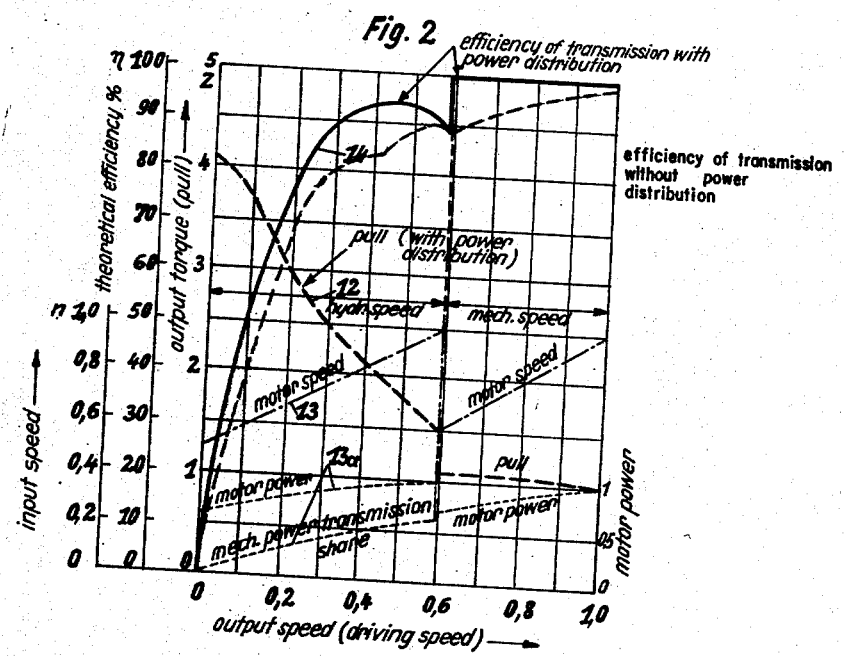
INVENTORS
FRITZ K. KUGEL
WILHELM L. GSCHING
BY
Toulmin & Toulmin
ATTORNEYS

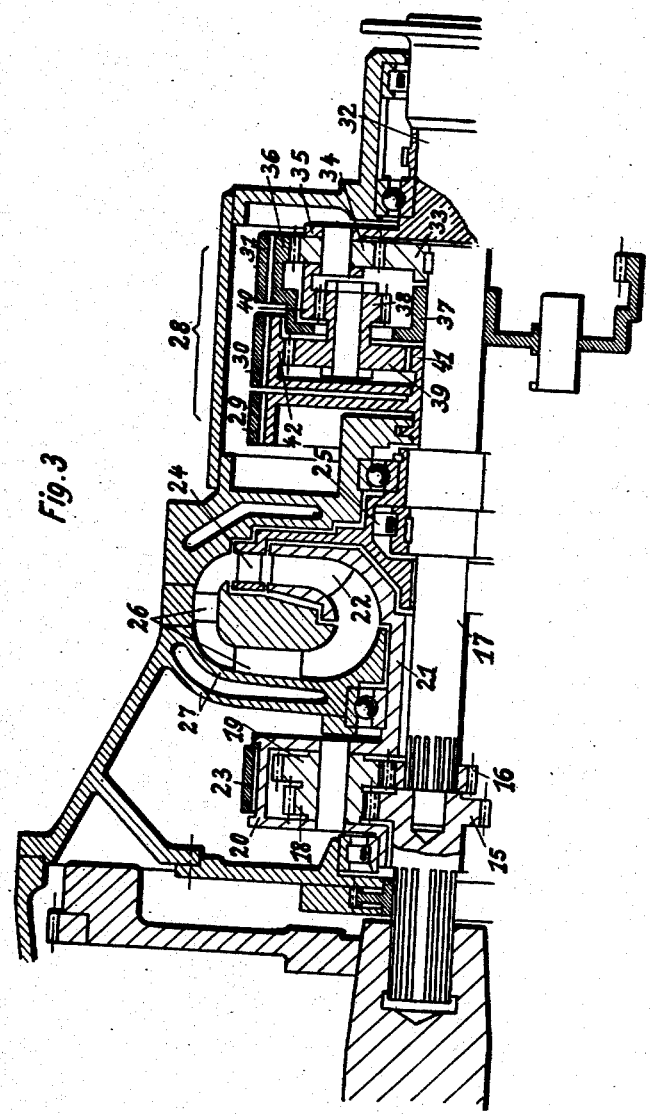

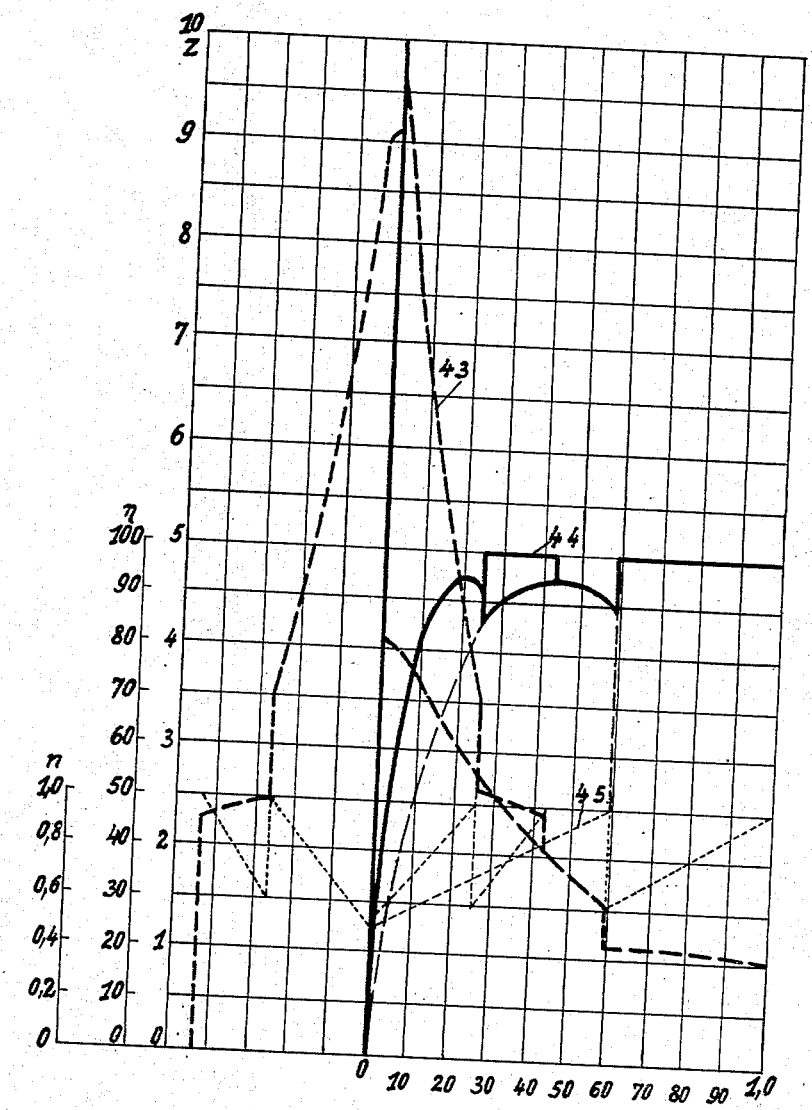

Aug. 31, 1954  F. K. KUGEL ET AL  2,687,657
FLUID DRIVE
Filed Feb. 27, 1950
6 Sheets-Sheet 5
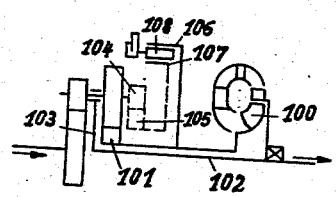
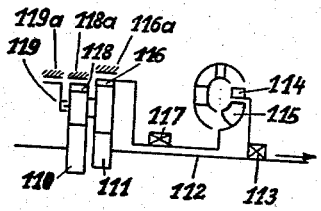
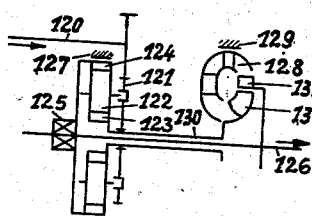
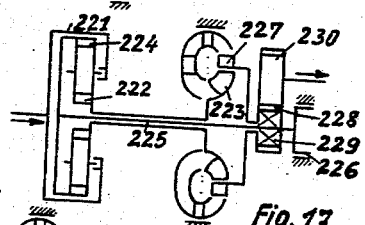
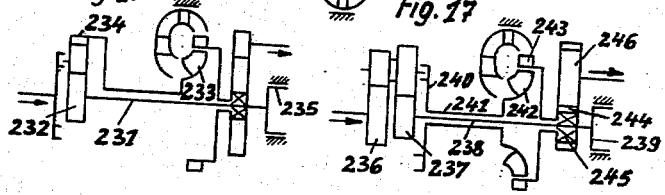
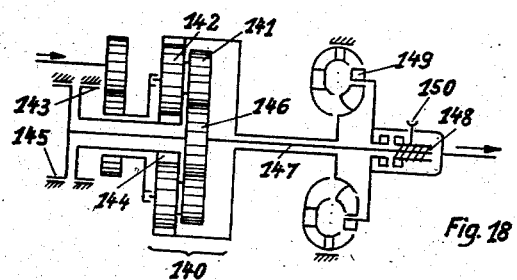
INVENTORS
FRITZ K. KUGEL
WILHELM L. GSCHING
BY
Toulmin & Toulmin
ATTORNEYS Aug. 31, 1954
F. K. KUGEL ET AL
2,687,657
FLUID DRIVE
Filed Feb. 27, 1950
6 Sheets-Sheet 6
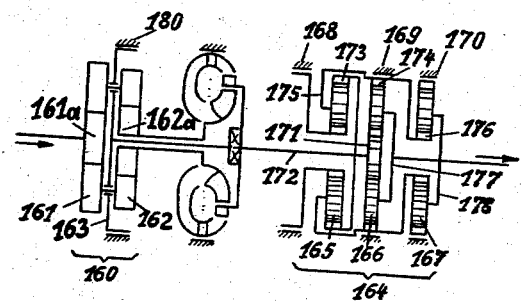
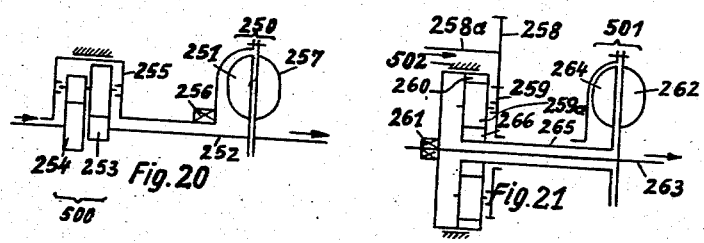
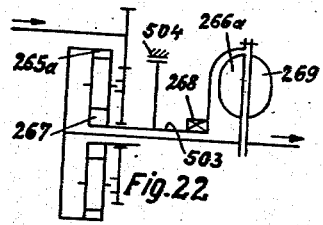
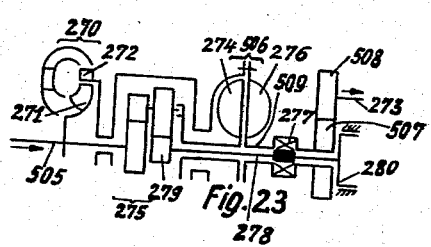
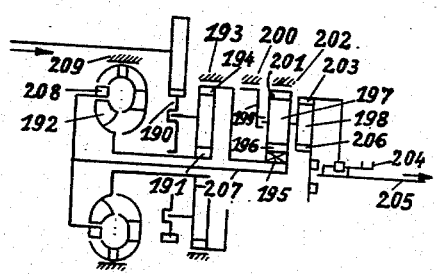
INVENTORS
FRITZ K. KUGEL
WILHELM L. GSCHING
BY
Toulmin & Toulmin
ATTORNEYS Patented Aug. 31, 1954

2,687,657

UNITED STATES PATENT OFFICE 2,687,657

FLUID DRIVE

Fritz K. Kugel and Wilhelm L. Gsching, Heidenheim, Germany, assignors to J. M. Voith Maschinenfabrik, Heidenheim, Germany Application February 27, 1950, Serial No. 146,426

16 Claims. (Cl. 74—688)

Transmission of power by means of fluid drives was adopted many years ago for motor vehicles on rails and has proved highly advantageous. Such fluid drives were however adopted for street vehicles only where the ratio between input power and vehicle weight was great, in other words where a relatively strong motor was available. Thus, for instance, quite a number of city and overland buses have been equipped with torque converters which can be coupled through at high speeds. Similarly a number of tractors have been equipped with torque converters. In addition thereto in recent years transmissions have been mass-produced for heavy automobiles, which transmissions comprise a torque converter which can be converted into a hydraulic coupling by allowing one or more guide wheels to rotate. In the last mentioned instance the torque converter is used merely for the starting period. In order to meet the requirements for a street vehicle, this combined torque converter coupling circuit is followed by a mechanical drive with at least two forward speeds and one rearward speed.

Already many years ago tests were run with such fluid drives comprising a torque converter and also a coupling in one circuit. Since, however, the compromise solution did not yield a sufficiently high total efficiency for at least one of the two conditions, this type of transmission was not generally adopted. The fact that similar solutions were adopted in certain areas is due to the fact that some passenger cars in use are characterized by a great ratio between input power and vehicle weight so that there is available a great reserve power.

For vehicles with a lower ratio of input power to vehicle weight such as small and medium automobiles, and especially for trucks, the above mentioned solutions would be impractical. The fact that hydraulic drives are being adopted for street vehicles only relatively slowly although the power transmission by hydraulic drives has numerous advantages over purely mechanical drives for street vehicles is in part due to the fact that it is not quite as easy as with gear change transmissions to follow their particular way of working. Another reason for this relatively slow adoption of fluid drives is due to the fact that the requirements to be met by a transmission for street vehicles cannot be fully met by a torque converter alone nor by a torque converter in combination with a hydraulic coupling. It is rather necessary to supplement the torque converter and coupling combination by additional devices. Such additional devices and possible means are however so numerous and of so many different types that the greatest handicap for the introduction of hydraulic transmissions for street vehicles is due to the difficulty in selecting the proper additional devices and means. Thus, it was suggested for instance to hook up a fluid drive, a torque converter or a torque converter and a coupling, with an ordinary gear transmission. Such an arrangement causes however additional costs which are prohibitive particularly for vehicles of medium or small size. According to another suggestion, a torque converter was hooked up with and followed by a planetary gear transmission provided with additional brakes and couplings. With this type of transmission it was intended to use the torque converter only for the starting period in one or two stages, whereupon the torque converter was supposed to be made ineffective, in other words it was to be bridged mechanically. This suggestion which dates back more than two decades created great hopes which however have not materialized.

According to further suggestions dating back in part fifteen and in part twenty years, a torque converter was hooked up with and preceded by a planetary gear transmission. This planetary gear transmission was so arranged that the power derived from the motor was transmitted in part mechanically and in part hydraulically to the driving shaft of the vehicle. However these suggestions did not lead to a satisfactory solution. Other inventors suggested complicated torque converter constructions with a plurality of turbine or guide wheels provided with fixed or adjustable blades. The arrangement was such that in most instances the individual stages were adapted by means of a free wheel driving automatically to hook themselves up or off depending on the driving conditions. Tests have also been made with adjustable wheel blades or parts of blade units. In connection with such arrangement it should however be noted that such tampering with the natural constructon of a converter with a pumping wheel, a turbine wheel and a fixed guiding device necessarily must lead to a decrease of the total efficiency and therefore to an increased fuel consumption.

It is an object of the present invention to provide a hydraulic transmission which will overcome the above mentioned draw-backs. To this end the invention makes use of features which are partly known or are known in combination with other features. More specifically a hydraulic circuit is made use of which comprises blade wheels (torque converter or hydraulic coupling) which rotate in the same direction, while this circuit in the direction of the power transmission is preceded by a planetary gear system. This planetary gear system acts as a power distributor in such a manner that a part of the planetary gear transmission is connected with the power input shaft while another part of the planetary gear system is hooked up with the pumping wheel and a still further part of the planetary gear system is hooked up with the turbine wheel. It is an object of the present invention to modify this combination, which is known per se and may be termed a hydro-mechanical differential drive, in such a manner that one power transmission path may be interrupted during the operation while simultaneously increasing the input number of revolutions of the other power transmission path. This object may be obtained according to the present invention in two ways: (a) the hydraulic power transmission path may be interrupted and the mechanical part may be driven with increased number of revolutions, or (b) the mechanical part may be interrupted and the hydraulic part may be driven with increased speed. In the first instance the pumping wheel or that part of the planetary gear connected thereto may be arranged so that it can be held stationary by applying a brake thereto, while the turbine wheel is coupled to the output shaft by means of a coupling for instance a free wheel drive which may be automatic or may be operated selectively. In the second instance the turbine wheel rigidly secured to the output shaft is connected with one part of the planetary gear transmission through an automatic or selectively operable coupling such as a free wheel drive, which part of the planetary gear transmission is additionally provided with a brake. When using a torque converter as hydraulic part of the hydro-mechanical differential drive, in the last mentioned instance such converter is provided with a rotatable guiding apparatus adapted during the operation of the circuit as a torque converter to be held stationary, whereas this guiding apparatus during operation as a coupling and after releasing the brake is allowed to rotate and to couple itself to the turbine wheel. The above mentioned draw-back of such a construction is advantageously modified with the last mentioned device by the increased driving speed during the operation of the coupling.

It has already been suggested, when using such hydro-mechanical differential drive employing a planetary gear transmission as a power distributor, to arrange the pumping wheel of the converter so that it can be held stationary by a brake while a free wheel drive is arranged between the turbine wheel and the output shaft. This known construction, however, concerns a so called backward torque converter in which the pumping wheel rotates in a direction opposite to the direction of rotation of the turbine wheel and in which for this purpose a reversing guide wheel is provided. In this known construction the motor is connected with the planetary ring of the planetary gear transmission, while the output shaft is connected with the carrier for the intermediate gears and the sun wheel is connected with the pumping wheel of the converter. Within the range of the starting speed, the pumping wheel is driven in a direction opposite to the direction of rotation of the motor, while the admission to the turbine wheel is effected again in the correct manner via the reversing guide wheel. Such reversing converters have a rather low total efficiency due to the loss incurred during the reversing operation. Furthermore, the introduction of the reversing guide wheel prevents a proper blade arrangement necessary to obtain a sufficient torque conversion.

According to a still further suggestion made heretofore, the motor is again connected with the outer ring of the power distributor of the planetary gear drive. This planetary gear drive, however, is provided with two sets of planetary wheels engaging each other of which one set meshes with the outer ring, while the other set meshes with the sun wheel. Connected to the sun wheel through a free wheel drive is the pumping wheel of a converter, whereas the turbine wheel is connected with the carrier for the intermediate wheels. This solution is unfavorable due to the fact that in view of the greater number of inter-meshing gears a corresponding higher loss is incurred.

The construction according to the present invention shows a material improvement over the heretofore mentioned known constructions inasmuch as the present invention allows the employment of a torque converter of general construction while obtaining a high total efficiency and allowing the application of a simple planetary gear transmission as power distributor.

Normally, the hydraulic part of the hydro-mechanical differential drive a torque converter will be employed. However, in specific cases it is also possible to use a hydraulic coupling as hydraulic part of the hydro-mechanical differential drive. This is particularly the case when this hydro-mechanical differential drive is provided with an additional converter the pumping wheel of which is directly coupled with the input shaft while the turbine wheel is directly coupled with the output shaft. According to a further embodiment of the invention, a converter as well as a coupling is connected with the planetary gear transmission in such a manner that it is possible to drive with power distribution during the employment of the converter as well as during the employment of the coupling.

According to the first embodiment using a pumping wheel adapted to be held stationary by a brake and also employing a turbine wheel coupled to the output shaft through a free wheel drive, the starting under application of a converter is effected by operation of the power distributor. The power is then, during the very first starting period, transmitted alone through the converter while with increasing output speed more and more power is transmitted via the mechanical power path, and finally by braking the pumping wheel to maintain the latter stationary and thereby also that part of the planetary gear drive connected thereto, the hydraulic circuit is interrupted while the mechanical part is driven with increased speed. During this operation the turbine wheel detaches itself from the output shaft and comes to a stand-still so that the torque converter is fully detached or made ineffective.

According to the second embodiment mentioned above and comprising a detachable mechanical path, the starting operation with the distributing means is followed by an operation of the hydraulic coupling without distributing means. When using a torque converter and a hydraulic coupling, it will be obvious that with this construction two hydro-mechanical speeds with power distribution are obtained and two purely hydraulic speeds. When using such a drive together with a free wheel drive it is possible by means of a simple additional device, namely the provision of a locking mechanism for the free wheel drive, to obtain a further brake speed with increased braking efficiency.

When using a pumping wheel adapted to be held stationary by application of a brake, in other words when using a detachable hydraulic circuit, braking with the motor will be possible in two stages. When using the first braking stage, the brake for the pumping wheel is released whereas the brake is applied for the second braking speed. Also with this construction an increased braking effect may be obtained by blocking the free wheel drive.

The distributing planetary drive connected to and preceding the hydraulic circuit may be constructed in a manner known per se as a one or two plane unit. Depending on the requirements to be met by the drive, for instance depending on whether the transmission ratio in the distributing drive is smaller, equal to, or greater than 1, and depending on whether additional operating possibilities are desired, various embodiments may be employed. A particular advantageous embodiment of the present invention consists in that the distributing drive is made as a one plane unit with a sun wheel and with a planetary ring but with two sets of inter-connected intermediate gears of different diameters which are arranged side by side in such a manner that the sun wheel meshes with one set of the intermediate gears while the planetary ring meshes with the other set of intermediate gears. In this way any desired drive ratio for the pumping wheel may be obtained. Occasionally it might be advantageous with a hydro-mechanical differential drive having a detachable hydraulic power path, to provide a mechanical coupling or clutch between two selected parts of the planetary drive, while the hydraulic part of the differential drive is arranged so that it can be fully detached. The coupling may be constructed as a friction clutch or as a synchronous jaw clutch. In order to make the converter detachable, the latter is constructed in such a manner that it can be emptied, or it is provided with a detachable guide wheel or guide wheel casing which during the normal operation of the torque converter is held stationary by means of a brake or via a free wheel drive. If, for instance, it is desired also to brake by the converter, a brake is to be substituted for the free wheel drive. This additional arrangement makes possible a third forward or third braking speed.

By combining a planetary gear drive, used as a power distributing transmission, with a torque converter, a material improvement of the transmission efficiency is obtained inasmuch as one part of the power is transmitted mechanically. The decrease in the torque conversion during the starting period in view of the power distribution is not only made good by the increased output speed but the effective torque converting ability is materially increased relative to the torque converting ability of the torque converter alone.

While generally it is desired to keep the motor speed low during the starting period, in specific instances it may be desired not to cause the torque converter to reduce the motor speed during the starting period so much. In such instances, it is a further suggestion, according to the present invention, to give the torque converter a power absorbing characteristic which increases with increasing speed ratio $n_2:n_1$.

With a drive according to the present invention the transmission ratio ($u$) in the distributing drive to the speed ratio ($\psi_u$) of the shifting point of the converter is of great importance. By "$u$" is meant the ratio of the number of teeth of that part of the planetary drive which is connected with the pumping wheel to the number of teeth of that part of the drive which is connected with the output shaft and this applies to a one plane distributing drive or that one plane distributing planetary gear for which each two plane gear can be calculated. By speed ratio at the shifting point of the converter is meant the ratio of the turbine wheel speed to the pumping wheel speed at that total efficiency which on the declining branch of the efficiency graph is just still admissible as the lowest value. Inasmuch as by the power distribution the total efficiency of the differential torque converter is increased relative to the efficiency of the converter only, a relatively large sector of the tip of the torque converter efficiency graph can be driven through. According to the invention the ratio of $$\frac{u}{\psi_u}$$

is to be selected approximately between 0.4 and 1.0. This applies to the range of the usually used gear steps $q$ (maximum speed to shifting speed) of approximately 1.4 to 2.0, the lower values of $$\frac{u}{\psi_u}$$

being applied to the lower values of $q$, and the higher values of $$\frac{u}{\psi_u}$$

being applied to the higher values of $u$.

When selecting a differential torque converter drive with a detachable mechanical or hydraulic transmission path comprising a selectively shiftable coupling between two parts of the distributing planetary drive in which it is possible to obtain a torque speed with power distribution, a mechanical direct speed and a fast speed, it is necessary to consider a sufficient step between the obtained direct speed and the converter speed with power distribution. In this connection the characteristics of the converter is of great importance. According to the present invention, it is suggested for this combination to employ a converter the maximum efficiency of which lies at a lower speed rate $\psi$ max. and the $\psi_u$ of which is located at approximately 0.3 to 0.5. The transmission ratio in the distributing drive will then have to be selected according to the invention at $u$ equalling about 0.4 to 1.0. The higher values of $u$ pertain to converters with lower $\psi_u$ and the lower values of $u$ pertain to torque converters with higher $\psi_u$. Also with this embodiment the lower values of $u$ are to be coordinated with the lower speed steps $q$ and the higher values of $u$ are to be coordinated with the greater speed steps $q$. The selection of the speed steps will depend among others also on the feature of the driving motor. If however, it is desired to employ a high speed converter, i. e. a converter the maximum efficiency of which lies at a high speed ratio, a downward transmission is to be interposed between the distributing drive and the pumping wheel of the converter or between the turbine wheel and the output shaft. In the first instance the dimensions of the converter are correspondingly greater.

According to a further development of the invention, in order to obtain a rearward speed, there is added a distributing drive comprising two sun wheels and intermediate gears with double rim, and an additional planetary gear set with a sun wheel adapted to be braked. The third set of intermediate gears is so arranged that the wheels are arranged on the same axle as the other intermediate gears, whereas the sun wheel meshing with these intermediate gears is adapted to be braked by a brake drum. The brake for the pumping wheel and the brake for the sun wheel of this third set of intermediate gears may be arranged one within the other in such a manner that they can be equipped with common brake shoes. In such an instance, such brake shoes may be provided with inner and outer linings and may be actuated selectively so that the brake shoes engage the outside of the one brake drum when it is desired to brake the pumping wheel, whereas the brake shoes engage the inner side of the other brake drum when it is intended to brake the sun wheel. In order to obtain an idling speed and a backward speed and in order to obtain a further materially reduced speed as may be necessary with vehicles subjected to great loads such as busses and heavy trucks, a differential torque drive described above and comprising a planetary distributing drive and torque converter or hydraulic coupling may be further modified according to this invention. To this end an additional planetary drive or a change gear adapted to be connected to the mechanism by means of a multiple disc coupling may be provided.

In the present description and drawings torque converters are referred to which comprise a converter composed of a single stage pump and turbine wheel and a two stage guiding device. The fluid is centrifugally passed through the pumping wheel and the turbine wheel of said converters, e. g. from the inner portion toward the outer portion thereof. The first stage of the guiding device is passed through by the fluid in axial direction, while the second stage is passed through by the liquid centripetally, i. e. from the outer portion toward the inner portion. It should, however, be noted that also other converters may be used according to the present invention provided the converters meet the respective requirements. Particularly converters with a plurality of stages in the pumping and turbine wheel may be used. The torque converter shown and described in the present invention is a converter of high efficiency adapted to effect a high torque conversion and has been proved highly advantageous in practice. It is a matter of course that not all solutions according to the present invention and set forth in the description are of equal advantage with one and the same type of vehicles. Some embodiments set forth in this description are of particular advantage for passenger automobiles, whereas other solutions are of particular advantage in connection with trucks and vehicles on rails.

The invention is illustrated by way of example in the accompanying drawings in which:

Figure 1 diagrammatically illustrates a first embodiment of the invention.

Figure 2 represents a graph illustrating the driving characteristics of a drive according to Figure 1.

Figure 3 illustrates a longitudinal section through the transmission.

Figure 4 is a graph illustrating the various characteristics of the drive according to Figure 3.

Figure 12 represents a still further modification of a two-plane distributing planetary transmission according to which the pumping wheel is connected with a sun wheel while the output shaft is connected with the carrier for the intermediate gears.

Figure 5:
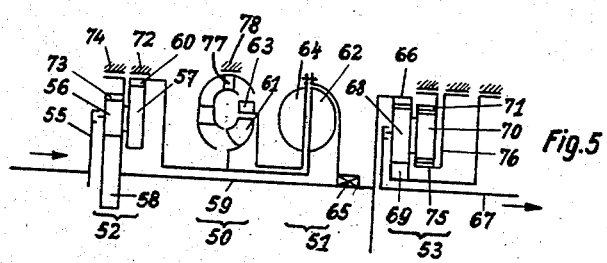
Figure 5 illustrates a further embodiment of the present invention.

Figure 13 diagrammatically illustrates a two-plane distributing planetary drive which is driven through a sun wheel.

Figures 14 to 24 show arrangements similar to those of Figures 1 to 13, however, with the difference that not the hydraulic transmission branch but the mechanical transmission branch of the differential drive may selectively be made ineffective.

In order to facilitate the understanding of the invention and the comparison between the various embodiments shown in the drawings, all transmissions are shown in such a manner that on the left hand side the input shaft connected to the motor is located, while on the right hand side the output shaft is arranged. Referring now to Figure 1 in particular, the structure shown therein comprises a motor shaft 1 to which is connected the set of intermediate gears 2 which mesh with the planetary ring 3 and the sun wheel 4. The planetary ring 3 is connected with the interplanetary ring 3 which latter carries the brake drum 6 and the converter pumping wheel 7. The sun wheel 4 is rigidly connected to the output shaft 8, and also connected to the output shaft 8 is the turbine wheel 9 of the converter via free wheel coupling or drive 10. This free wheel drive or coupling is so arranged that it can effect a power transmission from the turbine wheel to the output shaft if the speed of the output shaft is lower than that of the turbine wheel, whereas, if the speed of the output shaft increases beyond the speed of the turbine wheel, the power transmission is interrupted. G designates the stationary guide wheel or guiding apparatus.

At the instance of starting the output shaft 8 and, therefore, also, the sun wheel 4 are at a stand-still. Consequently, the intermediate wheels merely revolve about the teeth of the sun wheel and via the planetary ring 3 drive the pumping wheel 7 with a transmission into high. Due to the high speed, the pumping wheel 7 receives a great torque and thereby loads the motor so that the latter during the starting period has its number of revolutions reduced. The pumping wheel thus transmits its motion via the turbine wheel 9 and coupling 10 to the output shaft 8. At this stage the power will be transmitted purely hydraulically. Due to the torque transmitted from the turbine wheel to the output shaft, the latter and thus, also, the sun wheel 4 begins to rotate and the vehicle begins to move. As soon as the sun wheel 4 rotates, a portion of the input power is conveyed mechanically via intermediate gears 2 and sun wheel 4 to the output shaft 8. With increasing speed of the output shaft and sun wheel, the share in the mechanically transmitted power increases, while the share of hydraulically transmitted power decreases since the transmission towards the pumping wheel is continuously reduced and the converter therefore receives less power. Simultaneously, the load upon the motor decreases so that the motor speed gradually increases until at a certain driving speed (shifting speed), for which the converter has been constructed the motor speed reaches its full high value. However, to the extent at which with increasing driving speed the share of hydraulically transmitted power decreases in favor of the mechanically transmitted share, also the total efficiency of the transmission increases relative to the hydraulic efficiency of the converter. As soon as the vehicle during the starting period has passed through the favorable range of the differential drive, the brake 11 is applied, thereby holding the planetary ring 3 and the pumping wheel 7 stationary. As a result thereof, the sun wheel is driven with increased speed inasmuch as the intermediate gears merely roll over the teeth of the planetary ring. In addition thereto, the converter without necessity of emptying the same is made ineffective inasmuch as also the turbine wheel due to the free wheel drive detaches itself when the speed of the output shaft increases beyond the speed of the turbine wheel.

Figure 2 represents a graph illustrating the driving characteristics of the simple two speed drive according to Figure 1. In this showing, however, the motor speed is not stated in a certain number of revolutions per minute, nor is the pulling force stated in pounds and the driving speed stated in miles per hour but the figures are given without dimensions, and the pulling force, the motor speed, and the driving speed are at the respective nominal speeds assumed to be 1. Marked above the output speed is the pulling force 12, the motor speed 13 and the efficiency 14 of the transmission, the mechanical loss and the loss due to auxiliary devices being neglected in the representation of the above graph. The graph, furthermore, shows the motor power and the division of the mechanical and hydraulic power transmission branch.

As will be seen from the graph, when starting with the throttle open, the power at disposal is approximately 4.1 the power at nominal speed. This corresponds to a mechanical transmission of 1:4.1. In this connection it should be noted that this pulling force in contrast to the driving conditions of a gear change drive is definitely available and for any desired time. The values and ratios obtained depend to a large extent on the selected transmission ratio in the distributing drive and on the quality of the converter. Generally, these driving features and power outputs of the differential transmission meet the requirements of a motor vehicle, provided arrangements are made for an idling speed and a rearward speed, as for instance by arranging an additional drive adapted selectively to be made operable. With heavy vehicles there is additionally required a further reduced mountain or low speed. Such a drive will be described in connection with Figures 3 and 4. The arrangement according to Figure 3 shows a two plane distributing planetary drive. The large sun wheel 15 is driven by the motor shaft, while the smaller sun wheel 16 is arranged on the transmission shaft 17. Meshing with the sun wheels 15 and 16 are the intermediate gears 18 and 19 respectively, which intermediate gears are carried by the planetary carrier 20. This carrier is a rotatable casing having connected thereto a hollow shaft 21 which latter carries the pumping wheel 22 of the converter. The carrier 20 together with the pumping wheel 22 may be stopped by means of a brake 23. The turbine wheel 24 is coupled to the transmission shaft 17 by means of a free wheel coupling or drive 25. The transmission shown in Figure 3 furthermore comprises a double guiding apparatus 26 and a double jacket 27 for a cooling liquid.

Associated with the transmission shaft 17 is a three plane planetary gear combination 28 that depending on which of the three brakes 29, 30, 31 is actuated will yield a slightly reduced normal speed, a greatly reduced mountain or low speed and a likewise greatly reduced backward speed. If all three brakes are made ineffective, the connection between the transmission shaft and the output shaft is interrupted so that the drive is idling.

The additional drive is constructed as follows: Arranged upon the transmission shaft 17 is the sun wheel 33, while the intermediate gears 34 meshing therewith are carried by a carrier 35 connected to the output shaft 32. The planetary ring 36 simultaneously forms the carrier 37 for the interconnected intermediate gears 38 and 39 of the intermediate and front planetary drive. The planetary ring 40 of the intermediate planetary drive is connected with the carrier 35. A sun wheel 41, meshing with the intermediate gears 39 and a planetary ring 42 may be stopped and held stationary by a brake 29 and 30, while the planetary ring 36 may similarly be braked by a brake 31. The intermediate planetary gear has no sun wheel. The device furthermore comprises a brake 23 for the distributing drive.

The graph according to Figure 4 shows marked over the driving speed, the pulling force, efficiency, and motor speed in all speeds of the transmission. The pulling force is numbered 43, while the efficiency is numbered 44 and the motor speed is numbered 45. As will be seen from this graph the theoretical efficiency, already at 12.5% of the maximum nominal speed reaches the value of 90% so that from this point on, only 10% of the motor power is lost in heat which motor power is reduced to 80% by the reduction of the speed. On the left side of the abscissa there are marked the conditions for the rearward speed which approximately correspond to the conditions prevailing in the low forward speed. When driving down hill, this transmission also makes it possible in the usual manner to produce a braking effect by means of the motor by merely taking off the gas. In order to increase the braking effect, the operator may shift to the low speed. An even further and stronger braking effect, for instance in emergencies, may be obtained by putting in the rearward speed. These shifting operations are possible at any time and at any driving conditions in contrast to the countershaft-gear change transmission which requires that, prior to the shifting to a low speed, the driving speed has to be reduced in order to enable the jaws to engage each other. With regard to the solutions mentioned above and adopted in fairly recent times, a transmission according to the present invention is characterized by a materially higher starting pulling power and greater efficiency. Consequently, such transmission uses less fuel within the starting range and at low driving speeds and does so with a simplified construction.

Referring now to Figure 5, this figure shows a transmission in which the hydraulic transmission part and the planetary gear is constructed in a special manner, thereby yielding a number of shifting possibilities. More specifically, the hydraulic transmission part consists of a torque converter 50 and a hydraulic coupling 51 which have associated therewith a planetary transmission 52 with double intermediate gears as a power distributing drive and which also have associated therewith a planetary drive 53 as an additional transmission. The motor shaft drives the carrier 55 for the two sets of intermediate gears 56 and 57. The sun wheel 58 meshing with the set of smaller intermediate gears is connected with the transmission shaft 59, and the gear ring 60 meshing with the other set of the intermediate gears 57 is connected with the hollow shaft which carries the converter pumping wheel 61 and the coupling wheel 62. The turbine wheel 63 of the converter and the turbine wheel 64 of the coupling are rigidly connected with each other and are associated through a free wheel coupling 65 with the transmission shaft 59. The additional transmission 53 consists of the planetary ring 66 connected to the transmission shaft, of the carrier connected to the output shaft 67 for the double intermediate gears of which latter one set of gears 68 meshes with a sun wheel 69 adapted to be braked for forward driving, while the other set of intermediate gears 70 meshes with a planetary ring 71 adapted to be braked for rearward driving. By providing a sun wheel 75 meshing with the smaller intermediate gears 70 and by braking the brake disc 76 connected to sun wheel 75, a further low forward speed can be obtained. For idling, all brakes are released. The arrangement is such that in the planetary transmission 52 the planetary ring 60 may be braked by means of a brake 72 while the planetary ring 73 meshing with the intermediate gears 56 may be braked by means of a brake 74.

For starting, first only the forward brake 76 of the additional transmission is applied, whereas the four other brakes are released. Thus, a converter operation with power distribution is obtained. By changing the filling from the converter 50 to the coupling 51 a hydraulic coupling speed with power distribution will be obtained. Then the brake 72 is applied, so that the transmission shaft 59 will be driven with increased speed. As a result thereof the turbine wheels of the coupling and of the converter will operatively detach themselves from the shaft through the free wheel drive. Consequently a purely mechanical speed will be obtained with a transmission ratio corresponding to the transmission ratio in the planetary transmission (56/57/59). By releasing the brake 72 and applying the brake 74, a further mechanical speed with increased transmission ratio will be obtained. With this transmission, the application of which is by no means limited to street vehicles but which may also be advantageously applied in particular for power railroad cars and locomotives, two hydraulic and two mechanical speeds are available for forward as well as for backward driving. These speeds may be doubled for forward driving by changing the brakes 71 and 76. The shifting from the first to the second hydraulic speed is effected by changing the filling of the hydraulic circuits, whereas the other speeds are made effective by applying and releasing the brakes. If only one converter is available and no hydraulic coupling and if the converter is to be permanently filled, a shiftable coupling is to be provided for the second mechanical speed and is to be arranged between the pumping wheel 61 of the converter and the planetary ring 60. This coupling is made ineffective for the second mechanical speed so that the pumping wheel will not be driven rearwardly. The coupling may also be constructed as a plural disc coupling which furthermore makes it possible to shift a normal shiftable change gear instead of a planetary transmission. A further possibility consists in the provision of a free wheel drive acting in reverse direction (backward free wheel drive) through which the pumping wheel during the driving conditions referred to will automatically detach itself from the planetary ring.

Instead of a shiftable or free wheel coupling, also a device for emptying the converter may be provided so that the free wheel coupling 65 may be omitted.

In some instances, it may also be desirable to be able to make the guiding apparatus or reactor 77 ineffective. To this end, a brake 78 may be provided adapted selectively to hold the guiding apparatus 77 stationary or to allow rotation of said guiding apparatus.

In view of its numerous shifting possibilities the transmission described in connection with Figure 5 is of particular advantage for vehicles under high load. It is, of course, understood that if less requirements are to be met, some of the devices referred to may be omitted. It should be borne in mind that with the arrangement of the distributor—planetary transmission referred to above together with a single hydraulic circuit, and a single additional drive merely for the idling and rearward speed, there are available for the forward as well as the rearward drive; a first hydraulic speed with power distribution, a second slightly increased mechanical speed, and a third greatly increased mechanical speed.

Figure 6:
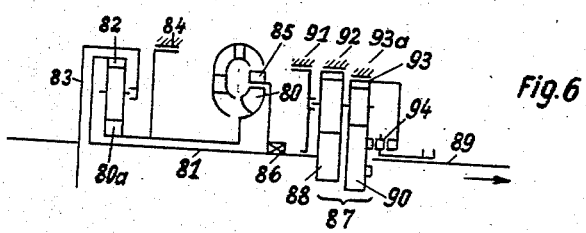
Figure 6 is a still further embodiment of the invention.

Referring now to Figure 6, the structure disclosed therein comprises a pumping wheel 80 of a converter which wheel, in contrast to the embodiments of Figures 1 to 5, is connected with the sun wheel 80a, whereas the transmission shaft 81 is connected with the planetary ring 82. The carrier 83 driven by the motor shaft extends around the outside of the planetary transmission. As a result thereof, the distributing drive will have a transmission ratio $u$ of less than 1. The pumping wheel 80 may again, by means of a brake 84, be held stationary while the turbine wheel 85 may be drivingly detached from the transmission shaft by means of a free wheel coupling 86. The additional transmission 87 is a two plane planetary transmission having its sun wheel 88 mounted on the driving shaft while the sun wheel 90 is rotatably mounted on the output shaft 89. The carrier for the intermediate gears may be held stationary by means of a brake 91 while the planetary ring meshing with one of the sets of intermediate gears may be held stationary by a brake 92. The planetary ring 93 meshing with the other set of intermediate gears is adapted by means of a jaw coupling box 94 to be coupled with the output shaft so as to rotate therewith. The said jaw coupling box 94 also serves for connecting the output shaft with the sun wheel 90 while simultaneously connecting the planetary ring and the sun wheel with the output shaft (direct speed). A further brake 93a is provided for maintaining the planetary ring 93 stationary. Depending on the position of the brakes and couplings, this transmission makes it possible to operate the torque speed with power distribution and the mechanical speed with detachable hydraulics with five forward and one rear speeds.

Figures 7, 8:
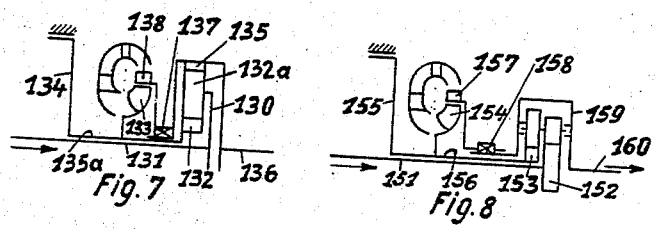
Figures 7 and 8 represent two further embodiments of the invention according to which the converter is followed by a planetary transmission.

Referring now to the arrangement according to Figure 7, the transmission disclosed therein includes a planetary gear system comprising a sun wheel 132, intermediate gears 132a carried by a carrier 130, and a gear ring 135. The carrier 130 is connected with the motor shaft 131. The sun wheel 132 is mounted on a hollow shaft 135a which also carries the pumping wheel 133 of the torque converter and the brake drum 134. The gear ring 135 is connected on one hand with the output shaft 136 and on the other hand with the inner ring of a free wheel drive 137 the outer ring of which carries the turbine wheel 138 of the torque converter.

According to the arrangement of Figure 8, the planetary transmission used for power distribution is constructed as a two plane transmission and, in a manner similar to that of Figure 7, is arranged behind the converter. The sun wheel 152 of this planetary transmission is mounted on the motor shaft 151, whereas the sun wheel 153 of this transmission is connected with the hollow shaft 156 which latter carries the pumping wheel 154 and the brake drum 155. The turbine wheel 157 of the converter is connected via a free wheel drive 158 with the carrier 159 which latter is carried by the output shaft 160.

Figures 9, 10:
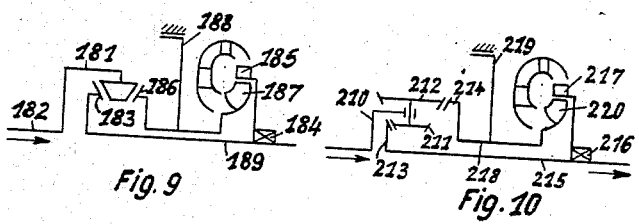
Figures 9 and 10 illustrate two hydro-mechanical transmissions according to the invention in which a planetary transmission with beveled gears is employed.

With reference to Figure 9, it will be noticed from the drawing that the arrangement disclosed therein comprises a planetary gear transmission with bevel gears. This gear transmission comprises a carrier 181 connected with the motor or input shaft 182. Of the two sun wheels pertaining to this gear transmission, the sun wheel 183 is connected with the output shaft 189, while the other sun wheel 186 is connected with the pumping wheel 187 and the brake drum 188. The output shaft 189 is connected with the turbine wheel 185 via a free wheel drive 184.

The arrangement according to Figure 10 likewise employs a planetary transmission with bevel gears. However, in contrast to the structure of Figure 9, Figure 10 shows a carrier 210 supporting two sets of different size intermediate gears 211 and 212, of which the gears 211 mesh with the sun wheel 213, while the gears 212 mesh with the sun wheel 214. The sun wheel 213 is mounted on the output shaft 215 which in its turn via a free wheel drive 216 is connected with the turbine wheel 217. The bevel gear 214 drives the shaft 218 which latter has connected thereto the brake drum 219 and the pumping wheel 220.

With the transmission according to Figure 9, the speed ratio u equals 1, whereas the speed ratio is greater than 1 with the transmission according to Figure 10. By using other combinations, the arrangement according to Figure 10 also makes possible a speed transmission ratio u less than 1.

Figure 11:
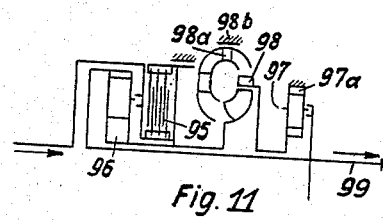
Figure 11 shows a further modification of the invention according to which only one hydraulic circuit and one plural disc coupling is employed for connecting the sun wheel of the distributing drive with the input shaft.

Referring now to Figure 11, the transmission diagrammatically illustrated in this figure illustrates an arrangement referred to in connection with the discussion of Figure 5 according to which only one hydraulic circuit and one plural disc coupling 95 is employed for connecting the sun wheel 96 of the distributing drive with the input shaft. As a special feature it should be mentioned that with this transmission, there is interposed between the turbine wheel 98 of the converter and the output shaft 99 a planetary transmission 97 yielding a transmission into low. This arrangement makes it possible to employ a fast converter. The planetary ring 97a of the planetary drive 97 is fixedly supported by the transmission casing. Whenever operation of any of the two possible mechanical speeds is desired, the converter will be emptied.

If the distributing drive cannot be coupled through, in other words if the coupling 95 is missing, the hydraulic power transmission path may be interrupted with the converter remaining filled, by holding the planetary ring 97a stationary by means of a brake which is released when employing the mechanical speed. The planetary transmission 97 will then, with the planetary ring held stationary, assume also the function of the free wheel drive 10 described in connection with Figure 1 or the free wheel drive 65 described in connection with Figure 5. According to a further modification, the guiding apparatus or reactor 98a may be arranged so that it can selectively be allowed to rotate or to be held stationary by means of a brake 98b.

Figure 12 illustrates a further modification of a two plane distributing planetary transmission according to which the pumping wheel 100 is connected with a sun wheel 101 while the output shaft 102 is connected with the carrier 103 for the intermediate gears. This carrier is arranged intermediate the two sets of intermediate gears. In addition to the said two sets there is provided a further set of intermediate gears 104 having associated therewith a sun wheel 105 adapted to be held stationary by a brake. The pumping wheel brake 106 and the brake 107 for the sun wheel 105 are so constructed that they have common brake shoes 108 adapted alternately to be made effective. By applying the brake pertaining to the sun wheel 105 the rearward speed will be made effective.

Figure 13 shows a further modification of a two plane distributing planetary drive which is driven through a sun wheel 110. The smaller sun wheel 111 is connected with the output shaft 112 which also has connected thereto the turbine wheel 114 of the converter through a free wheel drive 113. The pumping wheel 115 is driven via the planetary gear ring 116 and through the intermediary of a free wheel backward drive 117. The two planetary gear rings 116 and 118 as well as the carrier 119 for the intermediate gears are adapted to be held stationary by a brake 116a, 118a, 119a respectively. When starting with the converter speed with power distribution, all brakes are released. The converter is driven with a low transmission ratio into fast, then the brake 116a is applied and thus the pumping wheel 115 is held stationary. The output shaft will be driven purely mechanically through the planetary transmission. The turbine wheel 114 by means of free wheel drive 113 detaches itself from the output shaft. When shifting to the next speed with greater transmission ratio, the brake 118a is applied and the brake 116a is released. Through the free wheel drive 117 the pumping wheel detaches itself from the planetary gear ring 116 which now rotates in reverse direction. A further speed with still greater transmission ratio can be obtained by applying the brake 119a pertaining to the carrier for the intermediate gears while releasing the brake 118a.

As mentioned before, the embodiment shown in Figures 14 to 24 of the present invention differ from the embodiments illustrated in Figures 1 to 13 in that not the hydraulic transmission branch but the mechanical transmission branch of the differential drive is adapted to be made ineffective. The operation of such a drive may be described in connection with Figure 14.

The motor shaft 120 drives the carrier 121 for the intermediate gears 122 which latter mesh with the sun wheel 123 and the planetary gear 124. The sun wheel 123 is rigidly connected through the hollow shaft 130 with the pumping wheel 131, whereas the planetary gear ring 124 via a free wheel coupling 125 is connected with the output shaft 126 which latter has keyed thereto the turbine wheel 132. The planetary gear ring 124 is adapted to be held stationary by means of a brake 127. The converter comprises a rotatable guiding apparatus 128 which is adapted during the operation of the converter to be held stationary by means of a brake 129. For starting purposes the guiding wheel of the converter is held stationary by applying the brake 129, and the power is transmitted to the output shaft hydraulically through the converter and partly mechanically through the planetary gear ring. Then the brake 127 is applied and the brake 129 pertaining to the guiding wheel is released as a result of which the converter pumping wheel and through the hydraulic coupling action also the turbine wheel is driven with an increased speed. The output shaft is then able to rotate freely in the free wheel drive. The converter will during this working condition work as hydraulic coupling. While a torque converter with rotating guide wheel, at the same speed it has during the operation of the converter, will not have a sufficient transmitting capability, as is well known, inasmuch as it will have too great a slip and therefore is generally disadvantageous as mentioned above for this driving stage, according to the present invention after the guiding wheel has been detached, the pumping wheel and, therefore, also the turbine wheel are driven at increased speed. As a result thereof, the torque transmitted through the hydraulic circuit acting as a hydraulic coupling is increased. Thus, the converter, also when driven as a coupling, will have a sufficiently high transmitting capability with sufficient low slip. In contrast to the embodiments referred to above, in the last mentioned instance the shock absorbing features of hydraulics can be exploited with all speeds.

The embodiments shown in Figures 15, 16 and 17 are generally very similar to the device shown in Figure 14 and differ from the latter merely in some slight difference in arrangement of the various parts as will be clear from the drawings. According to Figure 15, the motor or input shaft is again connected with the carrier 221 of the planetary transmission, the sun wheel 222 of which drives the pumping wheel 223. The gear ring 224 is connected with the intermediate shaft 225 which at its rear end carries a brake drum 226. The turbine wheel 227 of the converter is connected with the gear 228 which latter is connected through a free wheel drive 229 with the intermediate shaft 225 and meshes with a gear 230 driving the output shaft 230a.

The embodiment according to Figure 16 differs from that of Figure 15 merely in that the connection of the intermediate shaft with the sun wheel and the planetary gear ring is reversed. In other words, according to Figure 16, the intermediate shaft 231, instead of being connected to the gear ring, is connected to the sun wheel 232, while the pumping wheel 233, instead of being connected to the sun wheel, is connected to the gear ring 234. Also, in this embodiment, the intermediate shaft has connected thereto a brake drum 235.

According to the structure shown in Figure 17, the power distributing planetary transmission is constructed as a two plane planetary transmission. One sun wheel 236 is mounted on the input shaft, while the other sun wheel 237 is connected to the intermediate shaft 238 which also carries the brake drum 239. The gear carrier 240 is connected with the pumping wheel 242 by means of the hollow shaft 241. The turbine wheel 243 is connected with a gear 244 which in its turn is connected via a free wheel drive 245 with the intermediate shaft 238 and meshes with a gear 246 supported by the output shaft.

Referring now to Figure 18, the structure shown therein, comprises a planetary gear transmission 140 with double intermediate gears 141 and 142 and an additional sun wheel 144 adapted to be held stationary by a brake 143. The brake 145 and a jaw free wheel coupling 148 are provided for making the mechanical transmission branch ineffective. The brake drum of the brake 145 is mounted on an intermediate shaft 147 which also carries the sun wheel 146. The coupling 148 is arranged between the shaft 147 and the turbine wheel 149 rigidly connected to the output shaft. The free wheel coupling 148 is adapted to be locked by means of a manually operable shifting sleeve 150 in a manner similar to that described in connection with Figure 5.

Figure 19 illustrates a transmission with a power distribution drive 160 including a carrier 163 for two sets of intermediate gears 161, 162 respectively meshing with sun wheels 161a and 162a. The carrier 163 is arranged between the said two sets of intermediate gears. The additional transmission 164 again comprises three sets of intermediate gears 165, 166, 167, and three brakes 168, 169, 170. The brake 168 is applied for the normal speed. The brake 169 is intended for the low speed, while the brake 170 is applied for obtaining a rearward speed. When idling, all three brakes are released. The sun wheel 171 of the intermediate planetary gear is connected with the transmission shaft 172 which latter also carries the planetary gear ring 173 of the first set. The planetary gear ring 174 of the intermediate set is connected with the carrier 175 of the first set and with the sun wheel 176 of the third set. The carrier 177 of the second set and the carrier 178 of the third set are connected with the output shaft. The sun wheel of the first set, the planetary gear of the second set, and the planetary gear ring of the third set are adapted to be held stationary by means of the three brakes 168, 169, 170 respectively. A brake 180 is provided for braking the carrier of the intermediate gears of the distributing transmission.

Figures 20, 21, 22 illustrate an arrangement of a hydraulic coupling provided in the hydraulic transmission branch, while Figure 23 shows a device the hydraulic transmission branch of which has arranged therein a hydraulic coupling and in addition thereto a converter without power distribution. Here, specifically, the hydraulic part of the structure according to Figure 20 includes a hydraulic coupling 250 the pumping wheel 251 of which is drivingly connected through an intermediate shaft 252 with the smaller sun wheel 253 of a two plane planetary transmission 500. The other sun wheel 254 is mounted on the input shaft, while the carrier 255 for the planetary gears simultaneously serves as a brake drum and is connected through a free wheel drive 256 with the turbine wheel 257 of the hydraulic coupling 250.

Figure 21 illustrates an arrangement in which the input shaft 258a is adapted by means of a gear 258 to drive the carrier 259 for the intermediate gears 259a. The gear ring 260 of the planetary transmission is connected through a free wheel drive 261 with the output shaft 263 which latter also carries the turbine wheel 262 of the hydraulic coupling 501. The pumping wheel 264 of coupling 501 is drivingly connected with the sun wheel 266 of the planetary transmissions via a hollow shaft 265. Furthermore, a brake 502 is provided for braking the gear ring 260.

The arrangement according to Figure 22 is rather similar to that of Figure 21, however, the gear ring 265a, in contrast to Figure 21, is connected with the pumping wheel 266a, while the sun wheel 267 is connected through a hollow shaft 503 and a free wheel drive 268 with the turbine wheel 269.

The structure shown in Figure 23, comprises a torque converter 270, the pumping wheel 271 of which is directly connected to the input shaft 505. The turbine wheel 272 of the converter 270 is rigidly connected to the turbine wheel 276 of the hydraulic coupling 506. The turbine wheel 276 of this coupling is mounted on a hollow shaft 509 and is connected through the gears 507 and 508 with the output shaft 273. The sun wheel 279 of the two plane planetary gear transmission 275 is mounted on the shaft 278 which has also mounted thereon a brake drum 280. The shaft 278 is connected with the shaft 509 through a free wheel drive 277.

The transmission according to Figure 24 represents an arrangement which in addition to the idling speed has four hydraulic forward speeds and one rearward speed. The motor shaft drives the planetary carrier 190 the sun wheel 191 of which is connected with the pumping wheel 192. The planetary gear ring 194, adapted to be held stationary by a brake 193, is connected with the sun wheel 196 of the second intermediate gear set by means of a free wheel coupling 195. The sun wheel 196 is connected with the turbine wheel 208 through the intermediate shaft 207. A further brake 200 is provided for selectively braking the planetary carrier 199 which latter carries the intermediate gear 197 of this second set and the intermediate gears 198 of the next set. The planetary gear ring 201 may be held stationary by means of brake 202, whereas the planetary gear ring 203 depending on the position of the shiftable coupling sleeve 204 may be coupled with the output shaft. The coupling sleeve 204 also makes it possible to connect the sun wheel 206 with the output shaft. The brake 209 is intended to hold stationary or to detach the converter guide wheel.

By applying the brakes 200 and 209 and moving the coupling sleeve 204 toward the left, the first converter speed with power distribution is obtained. By releasing the brake 200 and applying the brake 202 the second converter speed with power distribution is made effective. In order to obtain the third speed, it is necessary additionally to apply the brake 193 and to release the guide wheel brake 209. This is a hydraulic coupling speed without power distribution. In this speed also converter operation would be possible. In order to obtain the fourth speed, the coupling sleeve 204 is moved toward the right so that it will effect the coupling of the sun wheel 206 and the planetary gear ring 203 with the output shaft. This is a hydraulic coupling speed with different transmission ratio.

In order to obtain the rearward speed, it is merely necessary to apply the brake 200 (or if desired both brakes 200 and 209) and to move the coupling sleeve 204 toward the right. When operating at the idling speed, all brakes have to be released and the coupling sleeve 204 has to be in its left or right hand position.

As will be clear from the foregoing description, the present invention is by no means limited to the particular constructions shown as examples in the accompanying drawings, but also comprises any modifications within the scope of the appended claims.

What we claim is:

1. In combination, a hydraulic torque converter including a pumping wheel and a turbine wheel arranged, when actuated, to rotate in one and the same direction, a power input shaft, a power transmission shaft, planetary gear means, including intermediate gears and in addition thereto three further active elements, namely a first sun wheel connected with the said input shaft, a carrier for said intermediate gears, and a second sun wheel, said intermediate gears consisting of two sets of gears arranged side by side and respectively meshing with said first and said second sun wheels, first power conveying means arranged drivingly to connect said transmission shaft with one part of said planetary gear means, second power conveying means arranged drivingly to connect another part of said planetary gear means with the transmission shaft through the said wheels of the hydraulic power transmission mechanism, coupling means arranged for cooperation with one of said power conveying means and operable to effect and interrupt the transmission of power from said input shaft through said last mentioned power conveying means to said transmission shaft, and braking means associated with that part of said planetary gear means which is connected to said last mentioned power conveying means and operable to bring about interruption of the transmission of power through said last mentioned power conveying means, to thereby cause an increase in the driving speed of the other power conveying means, the ratio of $u$ to $\psi_u$, i. e., the ratio of the drive ratio of said planetary gear means to the speed ratio between the said wheels of said torque converter at the shifting point being in the range of from .04 to 1.0.

2. A power transmission comprising in combination, hydraulic power transmitting means including rotatable elements arranged, when actuated, to rotate in one and the same direction, a power input shaft, first planetary gear means drivingly connected to said input shaft, a transmission shaft, first power conveying means arranged drivingly to connect said transmission shaft with one part of said first planetary gear means, second power conveying means arranged drivingly to connect another part of said first planetary gear means with the said transmission shaft through the said rotatable elements, coupling means arranged for cooperation with one of said power conveying means and operable to effect and interrupt the transmission of power from said input shaft through said last mentioned power conveying means to said transmission shaft, and braking means associated with that part of said first planetary gear means, which is connected to said last mentioned power conveying means, and operable to bring about interruption of the transmission of power through said last mentioned power conveying means, to thereby cause an increase in the driving speed of the other power conveying means, an output shaft, a second planetary gear means consisting of a first set, a second set and a third set of planetary gear transmissions, each of said sets comprising a planetary gear ring and intermediate gears respectively meshing therewith, said first and said third sets also comprising a sun wheel, the intermediate gears of said first and said second sets being rigidly interconnected, a carrier common to said last mentioned intermediate gears for supporting the same, said carrier being rigidly connected with the planetary ring of said third set, the sun wheel of said last mentioned set being keyed to said transmission shaft, a second carrier carrying the intermediate gears of said last mentioned third set and being drivingly connected with said output shaft and with the planetary ring of said second set, and with the braking means respectively associated with the sun wheel and the planetary ring of the first set and with the planetary ring of said third set which is connected with the carrier of the first and second sets, said braking means being arranged for selectively holding stationary said last mentioned sun wheel and said last mentioned two gear rings respectively.

3. A power transmission comprising in combination, a hydraulic torque converter including rotatable elements arranged, when actuated, to rotate in one and the same direction, a power input shaft, planetary gear means drivingly connected to said input shaft and including intermediate gears and in addition, three further active elements, namely, a first sun wheel connected with said input shaft, a carrier for said intermediate gears and a second sun wheel, said intermediate gears consisting of two sets of gears arranged side-by-side and respectively meshing with said first and second sun wheels, an output shaft, first power conveying means arranged drivingly to connect said output shaft with one part of said planetary gear means, second power conveying means arranged drivingly to connect another part of said planetary gear means with the output shaft through the hydraulic torque converter, coupling means arranged for cooperation with one of said power conveying means and operable to effect and interrupt the transmission of power from said input shaft through said one of said power conveying means to said output shaft, and braking means associated with that part of said planetary gear means which is connected to said one of said power conveying means, said braking means being operable to bring about interruption of the transmission of power through said one of said power conveying means, to thereby cause an increase in the driving speed of the other power conveying means, the transmission ratio of $u$ to $\psi_u$, i. e., the tranmission ratio of the planetary gear means to the speed ratio at the shifting point in the hydraulic power transmitting means being within the range of 0.4 to 1.0.

4. A power transmission comprising in combination, hydraulic power transmitting means including rotatable elements arranged to rotate in one and the same direction in operation, a power input shaft, first planetary gear means drivingly connected to said input shaft, a transmission shaft, first power conveying means arranged drivingly to connect said transmission shaft with one part of said first planetary gear means, second power conveying means to drivingly connect another part of said first gear means with the transmission shaft through the said rotatable elements, an output shaft, second planetary gear means drivingly interconnecting said transmission shaft and said output shaft, coupling means arranged for cooperation with one of said power conveying means and operable to effect and interrupt the transmission of power from said input shaft through said last mentioned power conveying means to said transmission shaft, brake means associated with one of said power conveying means and operable to interrupt the transmission of power therethrough, said second planetary gear means comprising a plurality of sets of planetary gears, including sun gears, one of which is connected with the transmission shaft, the carrier for the planet gears of the same said set being connected with the output shaft, and the ring gear for the same said set being provided with brake means, another of said sets also comprising a sun gear, intermediate gears and a ring gear, and brakes for said last mentioned sun and ring gears, and a carrier for said last mentioned intermediate gears being connected with the first mentioned of said ring gears.

5. An arrangement as set forth in claim 4, in which still another planetary gear set is included in said secondary planetary gear means including a ring gear connected with said output shaft and planet gears running thereon and connected with the intermediate gears of the second mentioned planetary gear set of said second planetary gear means.

6. In combination, a hydraulic power transmission including a pumping wheel and a turbine wheel arranged to rotate in one and the same direction in operation, an input shaft, a transmission shaft, a power output shaft, planetary gear means including a sun gear connected with said input shaft, another sun gear connected with said transmission shaft, and compound planet gears meshing with said sun gears, a carrier for said planet gears connected with said pumping wheel, brake means for braking said carrier, clutch means between said turbine wheel and said transmission shaft for coupling said turbine wheel to said transmission shaft in one direction of relative rotation therebetween, and for releasing the turbine wheel from the transmission shaft in the opposite direction of relative rotation therebetween, and second planetary gear means interconnecting said transmission shaft with said output shaft.

7. In combination, a hydraulic power transmission including a pumping wheel and a turbine wheel arranged to rotate in one and the same direction in operation, an input shaft, a transmission shaft, a power output shaft, planetary gear means including a sun gear connected with said first input shaft, another sun gear connected with said transmission shaft, and compound planet gears meshing with said sun gears, a carrier for said planet gears connected with said pumping wheel, brake means for braking said carrier, clutch means between said turbine wheel and said transmission shaft for coupling said turbine wheel to said transmission shaft in one direction of relative rotation therebetween, and for releasing the turbine wheel from the transmission shaft in the opposite direction of relative rotation therebetween, and second planetary gear means interconnecting said transmission shaft with said output shaft, said second planetary gear means comprising a third sun gear connected with said transmission shaft, intermediate gears meshing therewith, a carrier for said intermediate gears connected with said output shaft, and a ring gear meshing with said intermediate gears and provided with a brake for selectively clamping said ring gear against rotation.

8. An arrangement as called for in claim 7 in which said second planetary gear means comprises a second planetary gear set, including a sun gear, a ring gear and planet gears meshing therewith, brakes for selectively locking the said sun and ring gears of the said additional set, and a carrier for said planet gears connected with the ring gear of the first mentioned set of planet gears of said second planetary gear means.

9. An arrangement as called for in claim 8 in which a still further planetary gear set is provided comprising a ring gear connected with said output shaft and planetary gears running thereon and connected to rotate with the said planet gears of said second planetary gear set.

10. A power transmission according to claim 3 in which the said transmission ratio of $u$ to $\psi_u$ is closer to 0.4 for relatively small steps between two successive speeds and closer to 1.0 for larger steps between two successive speeds.

11. A power transmission according to claim 3 in which there is an output shaft in addition to said second shaft, and means connecting said second shaft with said output shaft comprising a second planetary gear means consisting of a first set, a second set and a third set of planetary gear transmissions, each of said sets comprising a planetary gear ring and intermediate gears respectively meshing therewith, said first and said third sets also comprising a sun wheel, the intermediate gears of said first and second sets being rigidly interconnected, a carrier common to said last-mentioned intermediate gears for supporting the same, said carrier being rigidly connected with the planetary ring of said third set, the sun wheel of said last-mentioned set being keyed to said second shaft, a second carrier carrying the intermediate gears of said last-mentioned third set and being drivingly connected with said output shaft and with the planetary ring of said second set, and braking means respectively associated with the sun wheel and the planetary ring of the first set and with the planetary ring of said third set which is connected with the carrier of the first and second sets, said braking means being arranged for selectively holding stationary said last-mentioned sun wheel and said last-mentioned two gear rings respectively.

12. A power transmission according to claim 2 in which the said transmission ratio of $u$ to $\psi_u$ is closer to 0.4 for relatively small steps between two successive speeds and closer to 1.0 for larger steps between two successive speeds.

13. A power transmission according to claim 2 in which there is an output shaft in addition to said second shaft, and means connecting said second shaft with said output shaft comprising a second planetary gear means consisting of a first set, a second set and a third set of planetary gear transmissions, each of said sets comprising a planetary gear ring and intermediate gears respectively meshing therewith, said first and said third sets also comprising a sun wheel, the intermediate gears of said first and second sets being rigidly interconnected, a carrier common to said last-mentioned intermediate gears for supporting the same, said carrier being rigidly connected with the planetary ring of said third set, the sun wheel of said last-mentioned set being keyed to said second shaft, a second carrier carrying the intermediate gears of said last-mentioned third set and being drivingly connected with said output shaft and with the planetary ring of said second set, and braking means respectively associated with the sun wheel and the planetary ring of the first set and with the planetary ring of said third set which is connected with the carrier of the first and second sets, said braking means being arranged for selectively holding stationary said last-mentioned sun wheel and said last-mentioned two gear rings respectively.

14. A power transmission as claimed in claim 1 with the coupling means arranged for cooperation with one of said power conveying means consisting of an overrunning clutch.

15. A power transmission as claimed in claim 2 with the coupling means arranged for cooperation with one of said power conveying means consisting of an overrunning clutch.

16. A power transmission as claimed in claim 3 with the coupling means arranged for cooperation with one of said power conveying means consisting of an overrunning clutch.

References Cited in the file of this patent

UNITED STATES PATENTS

| Number | Name | Date |
|---|---|---|
| 2,135,282 | Fottinger | Nov. 1, 1938 |
| 2,147,528 | Fottinger | Feb. 14, 1939 |
| 2,176,105 | Schneider | Oct. 17, 1939 |
| 2,232,101 | De Turk | Feb. 18, 1941 |
| 2,283,759 | Pollard | May 19, 1942 |
| 2,293,767 | Salerni | Aug. 25, 1942 |
| 2,301,451 | Pollard | Nov. 10, 1942 |
| 2,364,448 | Jandasek | Dec. 5, 1944 |
| 2,365,879 | Jandasek | Dec. 26, 1944 |
| 2,383,981 | Lysholm | Sept. 4, 1945 |
| 2,402,164 | Kelbel | June 18, 1946 |
| 2,416,129 | Swift | Feb. 18, 1947 |

FOREIGN PATENTS

| Number | Country | Date |
|---|---|---|
| 384,816 | Great Britain | Dec. 15, 1932 |
| 450,953 | Great Britain | Aug. 24, 1935 |